United States Patent
Bennett et al.

(10) Patent No.: US 9,989,699 B2
(45) Date of Patent: Jun. 5, 2018

(54) LOW BEND LOSS SINGLE MODE OPTICAL FIBER

(71) Applicant: Corning Incorporated, Corning, NY (US)

(72) Inventors: Kevin Wallace Bennett, Hammondsport, NY (US); Dana Craig Bookbinder, Corning, NY (US); Douglas Llewellyn Butler, Painted Post, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/790,726

(22) Filed: Oct. 23, 2017

(65) Prior Publication Data

US 2018/0120503 A1    May 3, 2018

Related U.S. Application Data

(60) Provisional application No. 62/413,605, filed on Oct. 27, 2016.

(51) Int. Cl.
*G02B 6/036* (2006.01)
*G02B 6/028* (2006.01)
(Continued)

(52) U.S. Cl.
CPC ....... *G02B 6/03661* (2013.01); *G02B 6/0286* (2013.01); *G02B 6/02242* (2013.01);
(Continued)

(58) Field of Classification Search
CPC ............ G02B 6/03661; G02B 6/02242; G02B 6/02266; G02B 6/02333; G02B 6/0286; G02B 6/2835
(Continued)

(56) References Cited

U.S. PATENT DOCUMENTS 5,067,975 A  11/1991  Backer et al.
5,140,665 A   8/1992  Backer et al.
(Continued)

FOREIGN PATENT DOCUMENTS

WO  2005010589 A1   2/2005
WO  2011109263 A1   9/2011
WO  2016168042 A1  10/2016

OTHER PUBLICATIONS

Ultra-Low Bending Loss Single-Mode Fiber for FTTH by Li et al; Journal of Lightwave Technology, vol. 27, No. 3, Feb. 1, 2009.*
(Continued)

*Primary Examiner* — Thomas A Hollweg
*Assistant Examiner* — Guy Anderson
(74) *Attorney, Agent, or Firm* — Svetlana Z. Short

(57) ABSTRACT

An optical fiber comprising: (i) a core region comprising an outer radius $r_1$, and $3.0 \leq r_1 \leq 7.0$ microns and a relative refractive index $\Delta_{1max}$ and $0.32\% \leq \Delta_{1max} \leq 0.5\%$; (b) a depressed index cladding region surrounding the core region comprising an outer radius $r_3$ and a relative refractive index $\Delta_3$ less than $-0.2\%$, and trench volume $V_3$ wherein $45\%$ $\Delta\text{-micron}^2 \leq |V_3| \leq 200\%$ $\Delta\text{-micron}^2$; (c) a first outer cladding region surrounding the depressed index cladding region and comprising a relative refractive index $\Delta_4$ and an outer radius $r_4$; and (d) a second outer cladding layer comprising 5 wt %-20 wt % titania, a relative refractive index $\Delta_5$, and a thickness $T_M$, wherein 3 microns $\leq T_M \leq 30$ microns, and outer radius $r_5 \leq 65$ microns; the optical fiber has a mode field diameter $MFD_{1550}$ and 8 microns $\leq MFD_{1550} \leq 10.5$ microns, a cutoff wavelength $\leq 1550$ nm when bent 1 turn around a 2.5 mm radius mandrel, and a bending loss at 1550 nm when using a mandrel comprising a radius of 2.5 mm of $\leq 1.0$ dB/turn.

28 Claims, 3 Drawing Sheets

(51) Int. Cl.
*G02B 6/02* (2006.01)
*G02B 6/28* (2006.01)

(52) U.S. Cl.
CPC ..... *G02B 6/02266* (2013.01); *G02B 6/02333* (2013.01); *G02B 6/2835* (2013.01)

(58) Field of Classification Search
USPC .................................................. 385/126–127
See application file for complete search history.

(56) References Cited

U.S. PATENT DOCUMENTS

| | | | |
|---|---|---|---|
| 5,180,411 A | 1/1993 | Backer et al. | |
| 5,241,615 A | 8/1993 | Amos et al. | |
| 5,318,613 A | 6/1994 | Amos et al. | |
| 5,410,567 A | 4/1995 | Brundage et al. | |
| 6,072,062 A | 6/2000 | Valles et al. | |
| 7,130,516 B2 * | 10/2006 | Wu | G02B 6/02004 385/128 |
| 7,272,289 B2 * | 9/2007 | Bickham | G02B 6/02242 385/100 |
| 7,450,807 B2 * | 11/2008 | Bickham | G02B 6/0365 385/123 |
| 7,565,820 B2 | 7/2009 | Foster et al. | |
| 8,732,675 B2 | 5/2014 | Liang et al. | |
| 8,891,925 B2 * | 11/2014 | Bickham | G02B 6/02395 385/127 |
| 9,798,079 B2 * | 10/2017 | Bookbinder | G02B 6/03627 |
| 9,851,499 B2 * | 12/2017 | Bookbinder | G02B 6/02019 |
| 9,851,501 B2 * | 12/2017 | Bookbinder | G02B 6/03672 |
| 2006/0039664 A1 * | 2/2006 | Bickham | G02B 6/02019 385/127 |
| 2010/0290781 A1 * | 11/2010 | Overton | C03C 13/046 398/43 |
| 2011/0064368 A1 | 3/2011 | Bookbinder et al. | |
| 2013/0044987 A1 * | 2/2013 | Bickham | G02B 6/02395 385/123 |
| 2013/0136407 A1 * | 5/2013 | Berkey | G02B 6/028 385/124 |
| 2013/0136408 A1 * | 5/2013 | Bookbinder | G02B 6/028 385/124 |
| 2014/0301708 A1 * | 10/2014 | Mishra | G02B 6/02 385/126 |
| 2014/0308015 A1 * | 10/2014 | Bookbinder | G02B 6/02395 385/124 |
| 2014/0352361 A1 * | 12/2014 | Dawes | C03B 37/012 65/397 |
| 2016/0214884 A1 * | 7/2016 | Inoue | C03B 37/01228 |
| 2017/0003445 A1 * | 1/2017 | Bookbinder | C03C 13/046 |
| 2017/0068046 A1 * | 3/2017 | Bickham | G02B 6/0288 |

OTHER PUBLICATIONS

Vethanayagam et al; "Mechanical Performance and Reliability of Corning Titan SMF CPC5 Fiber After Exposure to a Variety of Environments"; Proc. SPIE 1366, Fiber Optics Reliability, Feb. 1991; pp. 343-350.
International Search Report and Written Opinion PCT/US2017/058022 dated Jan. 25, 2018.

* cited by examiner

LOW BEND LOSS SINGLE MODE OPTICAL FIBER

This application claims the benefit of priority under 35 U.S.C. § 119 of U.S. Provisional Application Ser. No. 62/413,605, filed on Oct. 27, 2016, the content of which is relied upon and incorporated herein by reference in its entirety.

FIELD

The present invention relates to optical fibers having low bend losses and suitable for use with silicon photonic devices.

TECHNICAL BACKGROUND

The need for greater bandwidth and higher data transmission rates has motivated efforts to develop next-generation platforms for information storage and delivery. It is widely believed that optical information systems will provide superior performance to today's microelectronics-based systems. Integrated optical systems based on silicon photonics are a leading replacement technology for microelectronic systems. Silicon photonics interfaces with standard CMOS technologies and WDM (wavelength division multiplexing) to convert electrical signals to optical signals, to transmit optical signals, and to reconvert optical signals to electrical signals. In disaggregated systems, transfer of signals between units occurs through optical links that provide high bandwidth and high data transfer rates.

Data centers with disaggregated architecture are being proposed for future data centers, involving use of silicon photonics and WDM technology. While a number of these systems have focused on using multimode optical fibers, system architectures using single-mode fibers are also contemplated.

Consequently, there is a need for suitable optical fibers for such data center applications and like applications

SUMMARY

Disclosed herein are optical waveguide fibers comprising:
a core region comprising an outer radius $r_1$ and $3.0 \leq r_1 \leq 7.0$ microns and a relative refractive index $\Delta_{1max}$ and $0.32\% \leq \Delta_{1max} \leq 0.5\%$;
a depressed index cladding region surrounding the core region, the depressed index cladding region comprising an outer radius $r_3$ and a relative refractive index $\Delta_3$ less than $-0.2\%$, and an absolute volute of trench volume $V_3$ such $45\% \Delta\text{-micron}^2 \leq |V_3| \leq 200\% \Delta\text{-micron}^2$;
a first outer cladding region surrounding the depressed index cladding region, the outer cladding region comprising a relative refractive index $\Delta_4$ and an outer radius $r_4$; and
a second outer cladding layer a relative refractive index $\Delta_5$, said second outer cladding region comprising silica based glass doped with 5 to 20 wt % titania and having a thickness $T_M$, such that 2 micron $\leq T_M \leq 30$ microns, the second outer layer having an outer radius $r_5$ of not greater than 65 microns;
wherein the optical fiber has a mode field diameter at 1550 nm ($MFD_{1550}$) and 8.3 microns $\leq MFD_{1550} \leq 10.5$ microns, a single mode cutoff wavelength <1550 nm when bent 1 turn around a 2.5 mm radius mandrel, an effective area at 1550 nm of at least 65 micron$^2$ and less than 85 micron$^2$, and a bending loss at 1550 nm as determined by the mandrel wrap test using a mandrel comprising a radius of 2.5 mm-of $\leq 1.0$ dB/turn.

According to at least some exemplary embodiments of the optical fiber disclosed herein, the single mode cutoff wavelength is between 1100 nm and 1450 mm when the fiber bent 1 turn around a 2.5 mm radius mandrel. According to at least some exemplary embodiments disclosed herein 60% $\Delta\text{-micron}^2 \leq |V_3| \leq 200\% \Delta\text{-micron}^2$.

According to at least some exemplary embodiments disclosed herein the fiber exhibits bending loss at 1550 mm as determined by the mandrel wrap test using a mandrel comprising a radius of 2.5 mm-of $\leq 0.55$ dB/turn, and in some embodiments $\leq 0.4$ dB/turn, in some embodiments $\leq 0.2$ dB/turn, for example $\leq 0.1$ dB/turn, or even $\leq 0.01$ dB/turn.

According to at least some exemplary embodiments disclosed herein the fiber the outer radius $r_1$ of the core region is $3.0 \leq r_1 \leq 6$, and the trench volume $V_3$ is such that 70% $\Delta\text{-micron}^2 \leq |V_3| \leq 150\% \Delta\text{-micron}^2$.

According to at least some exemplary embodiments 80% $\Delta\text{-micron}^2 \leq |V_3| \leq 200\% \Delta\text{-micron}^2$, and in some embodiments 100% $\Delta\text{-micron}^2 \leq |V_3| \leq 150\% \Delta\text{-micron}^2$. According to at least some exemplary embodiments 60% $\Delta\text{-micron}^2 \leq |V_3| \leq 140\% \Delta\text{-micron}^2$, and in some embodiments 70% $\Delta\text{-micron}^2 \leq |V_3| \leq 140\% \Delta\text{-micron}^2$. In some embodiments 80% $\Delta\text{-micron}^2 \leq |V_3| \leq 140\% \Delta\text{-micron}^2$.

According to at least some exemplary embodiments 30 microns $\leq r_5 \leq 63$ microns, and in some embodiments 30 microns $\leq r_5 \leq 50$ microns. According to at least some exemplary embodiments 40 microns $\leq r_5 \leq 62.5$ microns. For example, in some exemplary embodiments, the outer radius $r_5$ of the second outer cladding is 62.5, 60, 55, 50, 42, 41.7, 35, 31.25, or 30 microns.

According to at least some exemplary embodiments the optical fiber has a fiber cutoff wavelength <1550 nm when bent 1 turn around a 2.5 mm radius mandrel, an effective area at 1550 nm of at least 65 micron$^2$ and less than 85 micron$^2$, and a bending loss at 1550 nm as determined by the mandrel wrap test using a mandrel comprising a radius of 2.5 mm-of $\leq 1.0$ dB/turn.

According to at least some exemplary embodiments the optical fiber has a 22 m cable cutoff wavelength less than 1550 nm. According to at least some exemplary embodiments the optical fiber has a 22 m cable cutoff wavelength less than 1300 nm, for example between 1000 nm and 1350 nm, for example between 1000 nm and 1300 nm. According to at least some exemplary embodiments the optical fiber has a 22 m cable cutoff wavelength between 1200 nm and 1550 nm, for example between 1200 nm and 1350 nm.

According to at least some exemplary embodiments the optical fiber the second outer cladding layer comprises 5 to 15 wt % titania, and 3 microns $\leq T_M \leq 15$ microns.

In some exemplary embodiments 2 micron $\leq T_M \leq 20$ microns. In some exemplary embodiments 2 micron $\leq T_M \leq 15$ microns. In some exemplary embodiments 3 micron $\leq T_M \leq 15$ microns. In some exemplary embodiments 2 micron $\leq T_M \leq 10$ microns. In some embodiments 2 micron $\leq T_M \leq 5$ microns.

In some embodiments the mode field diameter at 1550 nm ($MFD_{1550}$) is 9 microns $\leq MFD_{1550} \leq 10$ microns. In some embodiments the mode field diameter at 1550 nm ($MFD_{1550}$) 9.5 microns $\leq MFD_{1550} \leq 10.3$ microns.

In some embodiments the relative refractive index of the depressed index cladding region, $\Delta_3$, is $-0.2\% \leq \Delta_3 \leq -0.7\%$, and in some embodiments $-0.3\% \leq \Delta_3 \leq -0.5\%$.

According to the exemplary described herein the core region comprises α, and 10≤α≤100. However, in some exemplary embodiments 1≤α≤10.

According to at least some exemplary embodiments disclosed herein the fiber includes a coating surrounding the second outer cladding layer, the coating comprises: a primary coating P having a Young's modulus 0.1 to 1 MPa; and a secondary coating S having a Young's modulus of 1100 MPa to 2500 MPa, wherein the secondary coating has an outer coating diameter of not greater than 260 microns, in some embodiments not greater than 250 nm, and in some embodiments not greater than 242 microns, for example less than 210 microns According to at least some exemplary embodiments a micro-optic device comprises:
  a. a silicon-photonics chip;
  b. an optical fiber having a section bent to a bend radius of ≤5 mm; the fiber comprising:
     a core region comprising an outer radius $r_1$ in the range from 3.0 to 7.0 microns and a relative refractive index $\Delta_{1max}$ in the range from 0.32% to 0.5%;
     a depressed index cladding region surrounding the core region, the depressed index cladding region comprising an outer radius $r_3$ and a relative refractive index $\Delta_3$ less than −0.2%, and a trench volume $V_3$ such that of 45% Δ-micron² ≤|$V_3$|≤ 200% Δ-micron²;
     a first outer cladding region surrounding the depressed index cladding region, the outer cladding region comprising a relative refractive index $\Delta_4$ and an outer radius $r_4$; and
     a second outer cladding layer a relative refractive index $\Delta_5$ the second outer cladding region comprising silica based glass doped with 5 to 20 wt % titania and having a thickness $T_M$, such that 3 microns≤$T_M$≤30 microns, the second outer layer having an outer radius $r_5$ of not greater than 65 microns;
     wherein the optical fiber has a mode field diameter at 1550 nm (MFD$_{1550}$) is 8.3 microns≤MFD$_{1550}$≤10.5 microns, a single mode cutoff wavelength <1550 nm when bent 1 turn around a 2.5 mm radius mandrel, an effective area at 1550 nm of at least 65 micron² and less than 85 micron², and a bending loss at 1550 nm as determined by the mandrel wrap test using a mandrel comprising a radius of 2.5 mm-of ≤1.0 dB/turn.

In some embodiments the optical fiber has a section that is bent to a bend radius $r_b$ of not greater than 3 mm, for example 0.5 mm to 2.5 mm. In some embodiments the bend radius $r_b$ is 2.5 mm≥$r_b$≥1 mm, and in some embodiments 2.5 mm≥$r_b$≥1.5 mm.

In some embodiments the optical fiber has a section that is bent to a bend radius of ≤2.5 mm, and the fiber exhibits bending loss at 1550 nm as determined by the mandrel wrap test using a mandrel comprising a radius of 2.5 mm-of ≤0.55 dB/turn, and in some embodiments ≤0.1 dB/turn, or even of ≤0.01 dB/turn. In some embodiments the optical fiber has a section that is bent to a bend radius of ≤2 mm, and the fiber exhibits bending loss at 1550 nm as determined by the mandrel wrap test using a mandrel comprising a radius of 2 mm-of ≤1 dB/turn, for example ≤0.55 dB/turn, and in some embodiments ≤0.1 dB/turn, or even ≤0.01 dB/turn.

Reference will now be made in detail to the present preferred embodiments, examples of which are illustrated in the accompanying drawings.

DETAILED DESCRIPTION

Figure 1:
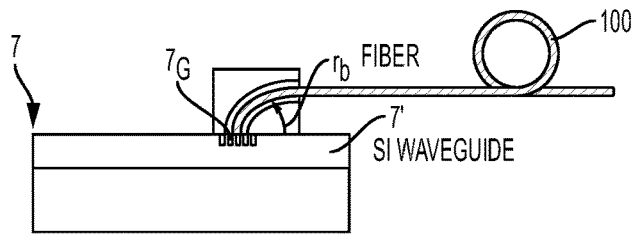
FIG. 1 illustrates an optical fiber coupled to a Si photonic waveguide through a ferrule connector with a curved hole for supporting a section of the optical fiber.

Additional features and advantages will be set forth in the detailed description which follows and will be apparent to those skilled in the art from the description or recognized by practicing as described in the following description together with the claims and appended drawings.

Definitions and Terminology

The "refractive index profile" is the relationship between refractive index or relative refractive index and the radial position within the waveguide fiber. The radius for each segment of the refractive index profile is given by the abbreviations $r_1$, $r_2$, $r_3$, $r_4$, etc. and lower and upper case are used interchangeably herein (e.g., $r_1$ is equivalent to $R_1$).

The term "relative refractive index percent" (also referred to herein as "relative refractive index", and "refractive index delta") is defined as $\Delta\% = 100 \times (n_i^2 - n_c^2)/2n_i^2$, and as used herein, unless stated otherwise, $n_c$ is the average refractive index of the first outer cladding region 40 (which in some embodiments is undoped silica). As used herein, the relative refractive index is represented by Δ and its values are given in units of "%", unless otherwise specified. The terms: delta, Δ, Δ %, % Δ, delta %, % delta and percent delta may be used interchangeability herein. That is, as used herein, relative refractive index percent (or relative refractive index, or refractive index delta) of a given fiber region is measured relative to undoped silica. In cases where the refractive index of a region is less than the average refractive index of undoped silica, the relative index percent is negative and may be referred to as having a depressed region or depressed index. In cases where the refractive index of a region is greater than the average refractive index of undoped silica, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r dr)^2 / (\int f^4 r dr),$$

where the integration limits are 0 to ∞, and f is the transverse component of the electric field associated with light propagated in the waveguide. The effective area $A_{eff}$ depends on the wavelength of the optical signal and is reported herein for wavelengths of 850 nm, 980 nm, 1060 nm and 1550 nm.

As used herein, unless otherwise noted, "effective area" or "$A_{eff}$" refers to optical effective area at a wavelength of 1550 nm.

The term "alpha parameter" or "α-parameter" or "alpha value" or just "α" refers to a parameter used to define a relative refractive index profile of the core, expressed in terms of $\Delta(r)$ which is in units of "%", where r is radius, which follows the equation, $$\Delta(r)=\Delta(r_o)(1-[|r-r_o|/(r_1-r_o)]^\alpha),$$

where $r_o$ is the point at which $\Delta(r)$ is maximum (also referred herein as $\Delta_{1max}$), $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number. In some embodiments of the optical fiber described herein (for example in fibers that do not have a centerline dip in the fiber core) $\Delta(r_0)=\Delta(r_i)$. In some embodiments $r_1 \equiv r_f$.

The terms "trench" and "depressed index cladding region" are used interchangeably herein and refer to a cladding region that has a minimum relative refractive index that is lower than that of the adjacent regions that are in contact therewith. The trench volume $V_3$ is defined herein as $$V_3 = 2\int \Delta_{3-2}(r)r\,dr$$

wherein $\Delta_{3-2}(r)=\Delta_3-\Delta_2(r)$ for a given radial position r situated between the radial positions of $r_3$ and $r_2$, where $r_2$ is the inner radius of cladding region 30 and $r_3$ is the outer radius of cladding region 30 Thus, the limits of integration for $V_3$ are from $r_2$ to $r_3$.

The terms "μm" and "microns" are used interchangeably herein.

The mode field diameter (MFD) is measured using the Peterman II method wherein, 2w=MFD, and $w^2=(2\int f^2\, r\, dr/\int [df/dr]^2\, r\, dr)$, the integral limits being 0 to ∞, and $MFD_{1550}$ is mode field diameter at 1550 nm wavelength.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

Fiber cutoff (also referred to herein as fiber cutoff wavelength) is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By fiber cutoff wavelength when bent 1 turn around a 2.5 mm radius mandrel we mean the fiber cutoff wavelength as measured by the standard 2 m fiber cutoff test, FOTP-80 (EIA-TIA-455-80) deployed with an additional single bend around a 2.5 mm radius mandrel situated within 20 cm distance from the end of the fiber where the light is launched. Similarly, by fiber cutoff wavelength when bent 1 turn around a 2 mm radius mandrel we mean the fiber cutoff wavelength as measured by the standard 2 m fiber cutoff test, FOTP-80 (EIA-TIA-455-80) deployed with an additional single bend around a 2 mm radius mandrel situated within 20 cm distance from the end of the fiber where the light is launched.

By cabled cutoff wavelength, or "cabled cutoff" as used herein, we mean the single mode cutoff as measured by the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

By cable cut off with a 2.5 mm radius bend, we mean the single mode cutoff as measured by the 22 m cabled cutoff test described in the EIA-445 Fiber Optic Test Procedures measured with an additional single bend around a 2.5 mm radius mandrel. Similarly, by cable cut off with a 2 mm radius bend, we mean the single mode cutoff as measured by the 22 m cabled cutoff test described in the EIA-445 Fiber Optic Test Procedures measured with an additional single bend around a 2 mm radius mandrel.

Unless otherwise noted herein, optical properties (such as dispersion, dispersion slope, etc.) are reported for the LP01 mode.

One challenging problem is to couple light from a silicon photonic device to a single mode fiber with low cost. An attractive approach is to use a grating to couple the light out of the surface of a silicon (Si) waveguide to an optical fiber as shown in FIG. 1. Because the tight space above the Si waveguide (about 4-5 mm, or less), the fiber needs to be bent with a quarter of turn at bend radius of approximately 3 mm or less, for example ≤2.5 mm. The bent fiber connector may be, for example, a glass or ceramic ferrule with curved hole. The fiber is stripped of the coating down to the glass cladding, and the stripped portion of the fiber is inserted into the hole and glued with an epoxy. The ordinary comparative fibers fiber can be easily damaged during stripping and subsequent the fiber insertion process through the hole in the coupling device 7 (connector 7), causing fiber mechanical failure due to fiber break, which results from surface flows undergoing stress due to being under stress because it is bent to a such a small diameter. Thus in comparative fibers, under stress, the surface defects would propagate deeper into glass, causing mechanical failure (fiber break) and/or shortened life cycle. However, the optical fibers 100 disclosed herein can be coupled to silicon photonic device even when bent to radii of 3 mm or less without mechanical failure due or fiber break. Optical fibers 100 advantageously can be advantageously inserted through the hole in the coupling device 7 that has a bend radius $r_b$ of 2.5 mm or less (e.g., 1 mm≤$r_b$≤2 mm, and in at least some embodiments even 0.5 mm≤$r_b$≤2 mm), without causing fiber mechanical failure due to fiber break, and thus can be bent to a such a small diameter without substantial loss of strength or significant loss of lifetime. Optical fibers 100 advantageously have improved surface damage resistance and low bending loss.

Optical fibers 100 disclosed herein are capable of exhibiting an effective area Aeff at 1550 nm which is greater than about 55 microns², preferably between 60 and 85 microns². In some preferred embodiments, the effective area at 1550 nm is between about 75 and 82 micron².

Figure 2A:
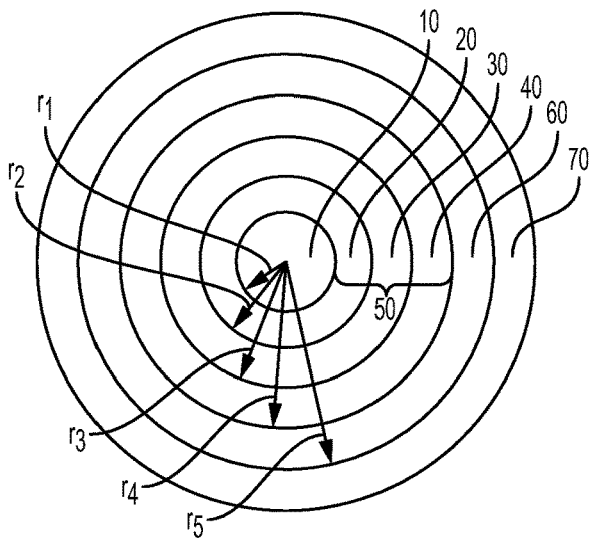
FIG. 2A a cross-sectional view of an example optical fiber according to the disclosure.

FIG. 2A is a cross-sectional view of one exemplary embodiment of the optical fiber (100). The optical fiber (100) comprises a central core region 10 centered around a central axis AC, and an optional inner cladding region 20, a third region 30 in the form of a trench and thus referred to as "trench region" 30 or "depressed cladding region," and a fourth region 40 making up a first outer cladding and thus referred to as an "outer cladding region" 40 (also referred to herein as a first outer cladding region 40). The optional inner cladding 20, the trench region 30, and the first outer cladding region 40 collectively define a cladding section 50 (also to referred herein as "cladding" (50). In the exemplary embodiments described herein cladding regions 20 30, 40 of the cladding 50 are preferably glass and is surrounded by a mechanical reliability layer $M_L$ (the outer most cladding layer or region 60) that comprises titania ($TiO_2$) doped silica. The outer cladding layer 60 (i.e., the mechanical stability layer $M_L$) may be surrounded by a coating 70 that includes a primary coating P and a secondary coating S, which can be stripped from a fiber 100 prior to bending and of the fiber 100 to a silicon-photonic device.

Figure 2B:
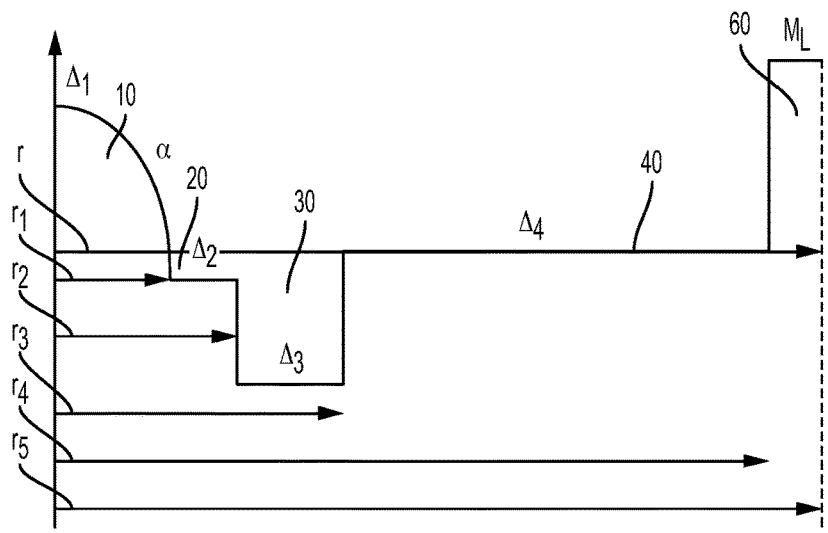
FIG. 2B. illustrates schematically a refractive index profile corresponding to the optical fiber of FIG. 2A.

FIG. 2B illustrates schematically relative refractive index profile Δ(%) versus fiber radius r of one exemplary embodiment of the optical fiber (100). The plot is from the central axis AC radially outward, i.e., from r=0. The core region 10 has outer radius $r_1$ and relative refractive index $\Delta_1$. The inner cladding region 20 extends from the radial position $r_1$ to a radial position $r_2$ and has relative refractive index $\Delta_2$. The trench region 30 (i.e., the depressed index cladding region) extends from the radial position $r_2$ to a radial position $r_3$ and has relative refractive index $\Delta_3$. The outer cladding region 40 extends from the radial position $r_3$ to radial position $r_4$ and has relative refractive index $\Delta_4$. The second outer cladding 60 (i.e., the outer most cladding region 60) surrounds the first outer cladding region 40. The second outer cladding region 60 extends from the radial position $r_4$ to radial position $r_5$ and has relative refractive index $\Delta_5 > \Delta_4$. In the fiber embodiments disclosed herein the outer diameter $d_5$ of the second outer cladding 60 ($d_5 = 2r_5$) is not greater than 130 microns, for example, not greater than 126 microns, not greater than 125 microns, and in some embodiments not greater than 100 microns or even not greater than 82 microns. For example, in some embodiments $d_5$ is not greater than 80 microns, not greater than 75 microns, not greater than 60 microns, not greater than 5 microns, or not greater than 50 microns. In some embodiments 20 microns≤$d_5$≤126 microns. In some embodiments 20 microns≤$d_5$≤110 microns, or 20 microns≤$r_5$≤100 microns, or 20 microns≤$r_5$≤90 microns, or even 20 microns≤$r_5$≤80 microns. In some embodiments 20 microns≤$r_5$≤70 microns, in some embodiments 20 microns≤$r_5$≤50 microns, and in some embodiments 60 microns≤$r_5$≤126 microns. In some embodiments 30 microns≤$d_5$≤126 microns. In some embodiments 30 microns≤$d_5$≤110 microns, or 30 microns≤$d_5$≤100 microns, 30 microns≤$r_5$≤90 microns, or even 30 microns≤$r_5$≤80 microns. In some embodiments 30 microns≤$r_5$≤70 microns. In some embodiments 30 microns≤$r_5$≤50 microns. In some embodiments 40 microns≤$d_5$≤126 microns. In some embodiments 40 microns≤$d_5$≤100 microns, 40 microns≤$d_5$≤90 microns or even 40 microns≤$r_5$≤80 microns. In some embodiments 40 microns≤$r_5$≤70 microns, and in some embodiments 40 microns≤$r_5$≤60 microns. According to some embodiments the diameter $d_5$ of the cladding layer 60 is, for example, 50 to 125 microns, or 60 to 125 microns; and in some embodiments 70 to 100 microns. In some embodiments 60 microns≤$d_5$≤126 microns, 60 microns≤$d_5$≤125 microns, in some embodiments in some embodiments 60 microns≤$d_5$≤110 microns, and in some embodiments 80 microns≤$d_5$≤125 microns.

A coating 70 surrounds the cladding layer 60. The coating 70 extends to an outer diameter $r_6$.

As stated above, optical fibers 100 are capable of providing low bend loss at tight radii of curvature and high resistance to surface damage for bent fiber connector applications, for example when used with a ferrule connector 5 coupling it to a silicon photonics chip 7, as shown in FIG. 1. In FIG. 1, inside the connector 5 the optical fiber is bent to about quarter of turn at a bend radius $r_b$ of about 3 mm or less (e.g., 0.5 mm≤$r_b$≤3 mm, 1 mm≤$r_b$≤2.5 mm, 1 mm≤$r_b$≤2 mm, 1 mm≤$r_b$≤1.5 mm, or 1 mm≤$r_b$≤2 mm) and coupled to a grating $7_G$ situated within a Si waveguide 7'. According to at least some the embodiments of the optical fiber 100 disclosed herein, the optical fiber 100 has a single mode cutoff wavelength <1550 nm when bent 1 turn around a 2.5 mm radius mandrel, and also has an effective area at 1550 nm of at least 65 micron$^2$ and less than 85 micron$^2$, and bending loss at 1550 nm as determined by the mandrel wrap test using a mandrel comprising a radius of 2.5 mm-of ≤1.0 dB/turn.

According to at least some of the embodiments of the optical fiber 100 disclosed herein, the bending loss at 1550 nm around a mandrel with a bend radius $r_b$ of 2.5 mm is ≤0.8 dB/turn, in some embodiments ≤0.5 dB/turn, in some embodiments ≤0.4 dB/turn, in some embodiments ≤0.2 dB/turn, in some embodiments ≤0.1 dB/turn, in some embodiments ≤0.05 dB/turn, and in some embodiments ≤0.01 dB/turn. Also, according to at least some the embodiments of the optical fiber 100 disclosed herein, the bending loss at 1550 nm with a bend radius $r_b$ of 2 mm is ≤1 dB/turn, in some embodiments ≤0.5 dB/turn, and in some embodiments ≤0.4 dB/turn. Also, according to at least some the embodiments of the optical fiber 100 disclosed herein the bending loss at 1550 nm with a bend radius $r_b$ of 2 mm is ≤0.2 dB/turn, in some embodiments ≤0.1 dB/turn, and in some embodiments ≤0.05 dB/turn. Also, according to at least some the embodiments of the optical fiber 100 disclosed herein the bending loss at 1550 nm with a bend radius $r_b$ of 2 mm is ≤0.02 dB/turn, and in some embodiments ≤0.01 dB/turn. Also, according to at least some the embodiments of the optical fiber 100 disclosed herein, the bending loss at 1550 nm with a bend radius $r_b$ of 1.5 mm is ≤1 dB/turn, in some embodiments ≤0.5 dB/turn, and in some embodiments ≤0.4 dB/turn, and in some embodiments ≤0.2 dB/turn. Also, according to at least some the embodiments of the optical fiber 100 disclosed herein, the bending loss at 1550 nm with a bend radius $r_b$ of 1 mm is ≤1 dB/turn, in some embodiments ≤075 dB/turn, in some embodiments ≤0.5 dB/turn, and in some embodiments ≤0.4 dB/turn, and in some embodiments ≤0.2 dB/turn.

The outer most cladding layer 60 (also referred to herein as layer $M_L$, or the second outer cladding layer) comprises $TiO_2$ (titania) and protects the outer glass surface of the first outer cladding 40 also referred to herein as the (first outer cladding region 40) from damage during handling and also during stripping of the coating 70, as well as improves fiber's mechanical reliability, especially in the presence of abrasions to the glass surfaces as can happen during assembly of miniature glass components.

In the profile of FIG. 2B, the trench region 30 in the cladding may have a constant refractive index that is less than the refractive indices of the inner cladding region 20 and the first outer cladding region 40. Core region 10 of the optical fiber 100 has the highest relative refractive index than fiber regions 20, 30 or 40. In some embodiments the core region 10 may include a lower index region at or near the centerline (known in the art as a "centerline dip"), which not shown in FIG. 2B.

It should be noted that the inner cladding region 20 is optional and may be eliminated as noted hereinabove. When inner cladding region 20 is missing, depressed index region 30 is directly adjacent core region 10. The relative ordering of relative refractive indices $\Delta_1$, $\Delta_3$, and $\Delta_4$ satisfy the conditions $\Delta_1 > \Delta_4 > \Delta_3$.

In the embodiments disclosed herein the relative ordering of relative refractive indices $\Delta_1$, $\Delta_2$, $\Delta_3$, and $\Delta_4$ satisfy the conditions $\Delta_1 > \Delta_4 > \Delta_3$ and $\Delta_1 > \Delta_2 > \Delta_3$. The values of $\Delta_2$ and $\Delta_4$ may be equal or either may be greater than the other, but both $\Delta_2$ and $\Delta_4$ are between $\Delta_1$ and $\Delta_3$.

According to the embodiments of the optical fiber 100 described herein, the maximum relative refractive index $\Delta_1$ of the core region 10 (relative to $\Delta_4$ of the the outer cladding region 40) is between 0.3% to 0.6%, more preferably between 0.32% to 0.5%. According to some embodiments the core region 10 has radius $r_1$ is between 3 to 6 μm, more preferably between 4 μm and 5 μm. The core region 10 can have a step index profile with $\alpha>10$, or alternatively can exhibit a graded index profile with $\alpha\leq10$, for example $\alpha\leq5$ (e.g., $1\leq\alpha\leq10$, or $1\leq\alpha\leq5$). The relative refractive index $\Delta_2$ of the inner cladding region 20 (relative to $\Delta_4$ of the the outer cladding region 40) is between −0.05 to 0.05%. The inner cladding region 20 can be pure silica glass, or silica glass doped with an up-dopant such as Cl, or $GeO_2$. The minimum relative refractive index $\Delta_3$ of the trench region 30 (relative to $\Delta_4$ of the the outer cladding region 40) is between −0.2 to −0.7%, and in some embodiments between −0.3 to −0.5%. In the exemplary embodiments the trench region 30 is silica based glass doped with boron or fluorine. The width w of the trench region 30 ($w=r_3-r_2$) is between 3 to 20 microns, in some embodiments between 4 and 15 microns. The outer cladding region 40 can be pure silica glass, or silica glass doped with an up-dopant such as Cl, or $GeO_2$. The cladding layer 60 (also referred to herein as "outer most cladding layer", the second outer cladding layer, or a "mechanical reliability layer") comprises 5 to 20 wt. % $TiO_2$, and in some embodiments, between 5-15 wt. % $TiO_2$. The outer most cladding layer 60 has a radial thickness $T_M$ between 3 to 30 microns, and in some embodiments, between 5 to 15 microns. The outer most cladding layer 60 improves mechanical stability/reliability of the fiber 100. In at least some embodiments $\Delta_5>\Delta_1$.

The outer cladding region 40 of the fiber 100, surrounds the lower index trench region 30. In the exemplary embodiments described herein the outer cladding starts at a radius $r_3$ has an outer radius $r_4$. The outer cladding region 40 of the fiber 100 comprises relative refractive index $\Delta_4$ which is higher than the relative refractive index $\Delta_3$ of trench region 30 thereby forming a region which is "updoped" with respect to trench region 30. The trench region 30 is preferably downdoped relative to pure silica, for example with fluorine or boron. Note, however that the outer cladding region 40 may be either pure silica, or may be updoped relative to pure silica.

The absolute value $|V_3|$ of the volume $V_3$ of the trench region 30 may be greater than 45% $\Delta$micron$^2$, and in some embodiments may be greater than 50% $\Delta$micron$^2$. The absolute value for the volume $V_3$ of the trench region 30 is in some embodiments is at least 60% $\Delta$micron$^2$, and in some embodiments is at least 80% $\Delta$micron$^2$. In some embodiments, the absolute value for the volume $V_3$ of the first cladding region (2) is less than 200% $\Delta$micron$^2$, in some embodiments less than 150% $\Delta$micron$^2$, and in some other embodiments less than 125% $\Delta$micron$^2$. According to some embodiments the absolute value of the volume $V_3$ is between about 45 and 200% $\Delta$ microns$^2$, for example between 60 and 200% $\Delta$ microns$^2$, or for example between 60 and 190% $\Delta$ microns$^2$, or between 45 and 175% $\Delta$ microns$^2$, or between 60 and 175% $\Delta$ microns$^2$, for example between 45 and 150% $\Delta$ microns$^2$, or between 60 and 150% $\Delta$ microns$^2$, between 80 and 150% $\Delta$ microns$^2$, or between 60 and 125% $\Delta$ microns$^2$, or between 80 and 125% $\Delta$ microns$^2$ According to some embodiments 80% $\Delta$-micron$^2\leq|V_3|\leq200\%$ $\Delta$-micron$^2$. microns$^2$ According to some embodiments 70% $\Delta$-micron$^2\leq|V_3|\leq150\%$ $\Delta$-micron$^2$. According to some embodiments 100% $\Delta$-micron$^2\leq|V_3|\leq150\%$ $\Delta$-micron$^2$.

The core and cladding regions of fiber 100 may be produced in a single-step process or multi-step process by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

Figure 3:
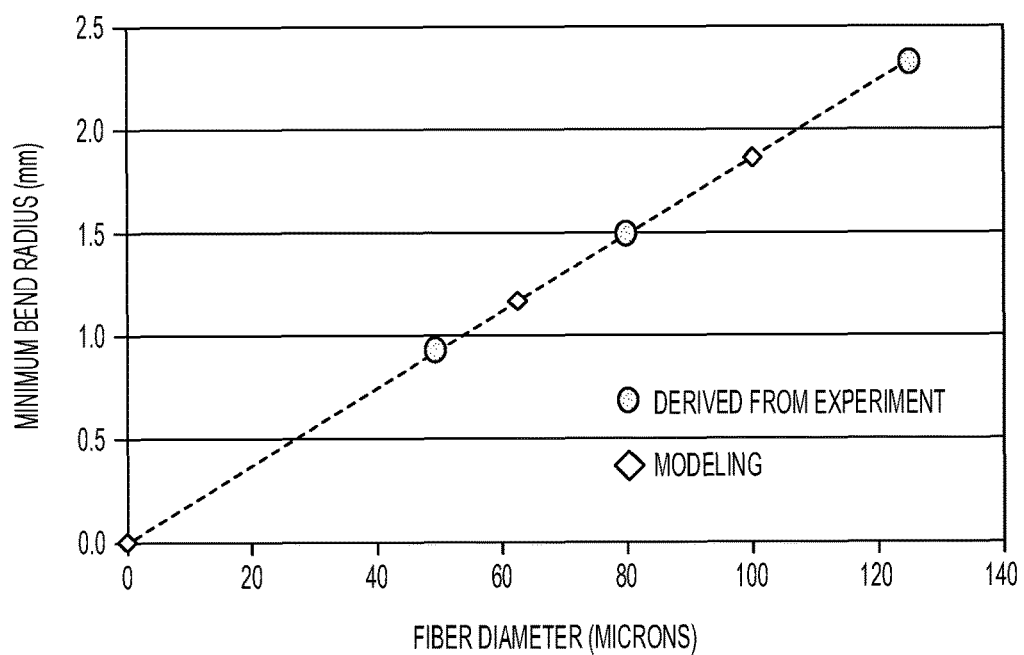
FIG. 3 illustrates the relationship between minimum bend radius (mm) and fiber cladding diameter (microns)

FIG. 3 illustrates a plot of modeled and measured minimum fiber bend radius as a function of fiber diameter (outer diameter of the cladding region 60). The plot line represents a $10^{-10}$ probability of failure over a 5 year lifetime for an 82° bend. The modeled results indicate the long term reliability limits of narrower cladding diameter fibers. The calculations for fiber reliability are for the optical fibers that can be used in short reach (fiber length l is <10 m, for example <1 m, and in some embodiments between 1 cm and 1 m, for example 1 cm to 50 cm, or even 1 cm to 25 cm) interconnects within data centers, especially hyperscale data centers. The short reach interconnects should have a fairly short usage lifetime (3-5 years), which is the same lifetime as the electronic equipment they will be connected to. These very short reach interconnects can be deployed within a rack or even within a server. (This is distinct from the optical fiber for use in trunk cables, etc., which is designed for operations over longer lengths (>50 m, e.g., 100 m-1 km), and which should have a longer usage lifetime.) The measured results (shown by circles in FIG. 3) are in agreements with the modeled results.

FIG. 3 illustrates that when the optical fiber 100 has an outer diameter of the cladding layer 60 of 125 mm the optical fiber 100 can be bent to a bent radius of about 2.3 mm with $10^{-10}$ probability of failure over a 5 year lifetime (i.e., the expectant life time of the bent fiber 100 is at least 5 years). Similarly, FIG. 3 illustrates that when the optical fiber 100 has an outer diameter of the cladding layer 60 of 100 microns the optical fiber 100 can be bent to a bent radius of about 1.9 mm with $10^{-10}$ probability of failure over a 5 year lifetime (i.e., the expectant life time of the bent fiber 100 is at least 5 years). In addition, FIG. 3 illustrates that when the optical fiber 100 has an outer diameter (i.e., the diameter $d_5$ of the cladding layer 60) of 62.5 microns, the optical fiber 100 can be bent to a bent radius of about 1.2 mm (with $10^{-10}$ probability of failure over a 5 year lifetime (i.e., the expectant life time of the bent fiber 100 is at least 5 years). FIG. 3 also illustrates that when the optical fiber 100 has an outer diameter of the cladding layer 60 of about 53 microns or less (e.g., 40–52 microns), the optical fiber 100 can be bent to a bent radius of about 1 mm or less with about $10^{-10}$ probability of failure over a 5 year lifetime (i.e., the expectant life time of the bent fiber 100 is at least 5 years).

FIG. 3 also indicates that when the cladding layer 60 the optical fiber 100 has an outer diameter $d_5$ of about 40 to 50 microns (or 20-50 microns), the optical fiber 100 can be bent to a bent radius of about 0.75 mm with $10^{-10}$ probability of failure over a 5 year lifetime (i.e., the expectant life time of the bent fiber 100 is at least 5 years). FIG. 3 also indicates that when the cladding layer 60 the optical fiber 100 has an outer diameter $d_5$ of 20-30 microns, the optical fiber 100 can be bent to a bent radius of about 0.5 mm with $10^{-10}$ probability of failure over a 5 year lifetime (i.e., the expectant life time of the bent fiber 100 is at least 5 years). Thus, the embodiments of the optical fibers 100 with an outer cladding layer 60 having an outer diameter of $d_5$ of not greater than 125 microns, for example not greater than 100 microns, or not greater than 82 microns (e.g., 80, 75, 65, 62.5, 50, 40, 30, 25, or 20 microns, or therebetween) can be bent to very tight bend radii $r_b$ and advantageously provide improved the mechanical reliability under tight bending conditions.

Based on our analysis the optical fibers 100 with an outer cladding layer 60 having an outer diameter of $d_5$ of not greater than 126 microns can be bent to very tight bend radii $r_b$ and advantageously provide improved the mechanical reliability under tight bending conditions even in the presence of small abrasions to the glass surfaces, as can happen during assembly of miniature glass assemblies, or due to stripping off of the coating layer 70 from the fiber.

According to some exemplary embodiments (for example those of Tables 1-4) the inner cladding region 20 and/or the outer cladding region 40 has a substantially constant relative refractive index profile, i.e. the difference between the relative refractive index at any two radii within the inner cladding region is less than 0.02%, and in some preferred embodiments less than 0.01%. Thus, according to at least some embodiments disclosed herein the relative refractive index profile of the outer cladding region 40, has substantially flat shape. Also, according to at least some embodiments disclosed herein the relative refractive index profile of the inner cladding region 20 has substantially flat shape.

The central core region (1) may be a step index core, or as shown, for example in FIG. 2B, it may comprise an alpha (α) shape (also see, for example, FIG. 4, below).

According to some embodiments the optical fiber exhibits:
(i) $MFD_{1550} > 8$ microns (e.g., 8.3 microns ≤ $MFD_{1550}$ ≤ 10.5 microns, and in some embodiments $MFD_{1550} > 9$ microns, for example 9 microns to 10.3 microns);
(ii) cable cutoff wavelength greater than 1260 nm and less than <1540 nm;
(iii) macrobend loss and is measured at 1550 nm wavelength at 2.5 mm radius mandrel ≤1 dB/turn; and
(iv) macrobend loss and is measured at 1550 nm wavelength at 5 mm radius mandrel <0.5 dB/turn.

According to some embodiments 1200 nm<cable cutoff wavelength<1540 nm. According to some embodiments 1200 nm<cable cutoff wavelength<1540 nm, when deployed with an additional single bend around a 2.5 mm radius mandrel.

According to some embodiments the optical fiber exhibits:
(i) $MFD_{1550} > 8$ microns (e.g., 8.3 microns ≤ $MFD_{1550}$ ≤ 10.5 microns or 8.5 microns ≤ $MFD_{1550}$ ≤ 10.5 microns, and in some embodiments $MFD_{1550} > 9$ microns, for example 9 microns to 10.3 microns);
(ii) cable cutoff wavelength greater than 1260 nm and less than <1540 nm;
(iii) bend loss at 2.5 mm radius mandrel ≤1 dB/turn;
(iv) bend loss at 5 mm radius mandrel <0.5 dB/turn
wherein the bend loss is macrobend loss and is measured at 1550 nm wavelength/

According to some embodiments the optical fiber exhibits 0.001 dB/turn<macrobend loss at 2.55 mm bend radius<0.55 dB/turn; and 0.001 dB/turn<macrobend loss at 5 mm bend radius<0.5 dB/turn; wherein the macrobend loss is measured at 1550 nm wavelength.

According to some exemplary embodiments the fiber exhibits:
$MFD_{1550} > 8$ microns (e.g., 8.3 microns ≤ $MFD_{1550}$ ≤ 10.5 microns, for example 8.3 microns ≤ $MFD_{1550}$ ≤ 10.5 microns, and in some embodiments $MFD_{1550} > 9$ microns, for example 9 microns to 10.3 microns));
Cable Cutoff <1570 nm;
Macrobend loss at 2.5 mm radius<0.5 dB/turn dB/turn, measured at a 1550 nm wavelength.

The fibers disclosed herein may be drawn from optical fiber preforms made using conventional manufacturing techniques and using known fiber draw methods and apparatus, for example as is disclosed in U.S. Pat. Nos. 7,565,820; 5,410,567; 7,832,675; 6,027,062, the specifications of which is hereby incorporated by reference.

Various exemplary embodiments will be further clarified by the following examples. It will be apparent to those skilled in the art that various modifications and variations can be made without departing from the spirit or scope of the claims.

Tables 1A, 1B, and 2-5, below, list characteristics of illustrative modeled fiber examples 1-21 having a refractive index similar to that shown in FIG. 2B. In particular, set forth below for each example is the relative refractive index $\Delta_1$, core alpha, and outer radius $r_1$ of the central core 10, relative refractive index $\Delta_2$ and outer radius $r_2$ of the first cladding region 20 and profile volume $V_3$ of the trench region 30, which is calculated between $r_2$ and $r_3$, as well as the relative refractive index $\Delta_3$. Also set forth are chromatic dispersion and dispersion slope at 1310 nm, chromatic dispersion and dispersion slope at 1550 nm, mode field diameter at 1310 nm and 1550 nm, fiber cutoff wavelength, MAC number at 1310 nm, and macro bend induced losses (dB/turn) calculated at 1550 nm wavelength when the bend radius $r_b$ is 2.5 mm and 5 mm, respectively. In the exemplary embodiments of Tables 1A-1C and Tables 2-4 the outer cladding region 40 is pure silica, and $\Delta_4=0$. Similarly, in the exemplary embodiments of Tables 1A-1C and Tables 2-4 the inner cladding region 20 is pure silica and $\Delta_2=0$; and in these exemplary embodiment delta ($\Delta_5$) of the outer cladding layer 60 was about 2%. Thus in these exemplary embodiments the refractive index of the inner cladding region 20 is the same as that of the outer cladding region 40.

TABLE 1A

| Parameter | Ex. 1 | Ex. 2 | Ex. 3 | Ex. 4 | Ex. 5 |
|---|---|---|---|---|---|
| Core delta (%) | 0.31 | 0.31 | 0.31 | 0.31 | 0.33 |
| Core dopant | GeO2 | GeO2 | GeO2 | GeO2 | GeO2 |
| Core alpha | 20 | 20 | 20 | 20 | 20 |

TABLE 1A-continued

| Parameter | Ex. 1 | Ex. 2 | Ex. 3 | Ex. 4 | Ex. 5 |
|---|---|---|---|---|---|
| Core radius ($r_1$, microns) | 4.7 | 4.7 | 4.7 | 4.7 | 4.5 |
| (Optional) Inner cladding delta | 0 | 0 | 0 | 0 | 0 |
| Outer radius of the optional inner cladding ($r_2$, microns) | 7.23 | 7.23 | 7.23 | 7.23 | 8.2 |
| Trench start ($r_2$, microns) | 7.23 | 7.23 | 7.23 | 7.23 | 8.2 |
| Trench delta (%) | −0.4 | −0.4 | −0.4 | −0.4 | −0.4 |
| Trench dopant | F | F | F | F | F |
| Trench end ($r_3$, microns) | 13.23 | 15.23 | 17.23 | 19.23 | 14.2 |
| Trench volume, (% · microns$^2$) | −49.1 | −71.9 | −97.8 | −127.0 | −53.8 |
| Outer radius $r_4$, of the outer cladding region 40) | 60.0 | 60.0 | 60.0 | 60.0 | 60.0 |
| Outer radius $r_4$, of the outer cladding region 40) | 60.0 | 60.0 | 60.0 | 60.0 | 60.0 |
| Outer cladding delta, $\Delta_4$ (%) | 0 | 0 | 0 | 0 | 0 |
| Mechanical stability layer (second outer cladding 60) outer radius ($r_5$, microns) | 62.5 | 62.5 | 62.5 | 62.5 | 62.5 |
| Mechanical layer dopant | TiO2 | TiO2 | TiO2 | TiO2 | TiO2 |
| Mechanical layer dopant (wt. %) | 10 | 10 | 10 | 10 | 10 |
| Outer radius (micron) of the glass portion of the fiber cladding | 62.5 | 62.5 | 62.5 | 62.5 | 62.5 |
| Theoretical Cutoff wavelength (nm) | 1199 | 1199 | 1199 | 1199 | 1217 |
| MFD at 1310 nm (microns) | 9.1 | 9.1 | 9.1 | 9.1 | 9.0 |
| Effective area at 1310 nm (microns$^2$) | 67.8 | 67.8 | 67.8 | 67.8 | 65.5 |
| Dispersion at 1310 nm (ps/(nm · km) | 3.5 | 3.5 | 3.5 | 3.5 | 2.2 |
| Dispersion slope at 1310 nm (ps/(nm2 · km) | 0.0927 | 0.0927 | 0.0927 | 0.0927 | 0.0921 |
| MFD at 1550 nm (microns) | 9.8 | 9.8 | 9.8 | 9.8 | 9.9 |
| Effective area at 1550 nm (microns$^2$) | 78.0 | 78.0 | 78.0 | 78.0 | 77.5 |
| Dispersion at 13550 nm (ps/(nm · km) | 21.7 | 21.7 | 21.7 | 21.7 | 20.4 |
| Dispersion slope at 1550 nm (ps/(nm2 · km) | 0.0635 | 0.0637 | 0.0638 | 0.0638 | 0.0642 |
| Cable Cutoff | 1309 | 1373 | 1446 | 1528 | 1308 |
| macro bend induced loss when bend around 2.5 mm bend radius ($r_b$), at 1550 nm (dB/turn) | 1.75 | 0.32 | 0.045 | 0.005 | 0.96 |
| macro bend induced loss when bend around 5 mm bend radius ($r_b$), at 1550 nm (dB/turn) | 0.4062 | 0.0753 | 0.0110 | 0.0013 | 0.2169 |

TABLE 1B

| Parameter | Ex. 2B | Ex. 3B | Ex. 4B | Ex. 5B |
|---|---|---|---|---|
| Core delta (%) | 0.31 | 0.31 | 0.31 | 0.33 |
| Core dopant | GeO2 | GeO2 | GeO2 | GeO2 |
| Core alpha | 20 | 20 | 20 | 20 |
| Core radius ($r_1$, microns) | 4.7 | 4.7 | 4.7 | 4.5 |
| (Optional) Inner cladding delta | 0 | 0 | 0 | 0 |
| Trench start ($r_2$, microns) | 7.23 | 7.23 | 7.23 | 8.2 |
| Trench delta (%) | −0.4 | −0.4 | −0.4 | −0.4 |
| Trench dopant | F | F | F | F |
| Trench end ($r_3$, microns) | 15.23 | 17.23 | 19.23 | 14.2 |
| Trench volume, (% · microns$^2$) | −71.9 | −97.8 | −127.0 | −53.8 |
| Mechanical layer start $r_4$, microns) | 30.0 | 35 | 30.0 | 27.0 |
| Mechanical layer end ($r_5$, microns) | 32.5 | 40 | 35 | 30 |
| Mechanical layer dopant | TiO2 | TiO2 | TiO2 | TiO2 |
| Mechanical layer dopant (wt. %) | 10 | 10 | 10 | 10 |
| Outer radius (micron) | 30 | 40 | 35 | 30 |
| Theoretical Cutoff wavelength (nm) | 1199 | 1199 | 1199 | 1217 |
| MED at 1310 nm (microns) | 9.1 | 9.1 | 9.1 | 9.0 |
| Effective area at 1310 nm (microns$^2$) | 67.8 | 67.8 | 67.8 | 65.5 |
| Dispersion at 1310 nm (ps/(nm · km) | 3.5 | 3.5 | 3.5 | 2.2 |
| Dispersion slope at 1310 nm (ps/(nm2 · km) | 0.0927 | 0.0927 | 0.0927 | 0.0921 |
| MFD at 1550 nm (microns) | 9.8 | 9.8 | 9.8 | 9.9 |
| Effective area at 1550 nm (microns$^2$) | 78.0 | 78.0 | 78.0 | 77.5 |
| Dispersion at 13550 nm (ps/(nm · km) | 21.7 | 21.7 | 21.7 | 20.4 |
| Dispersion slope at 1550 nm (ps/(nm2 · km) | 0.0637 | 0.0638 | 0.0638 | 0.0642 |
| Cable Cutoff | 1373 | 1446 | 1528 | 1308 |
| macro bend induced loss when bend around 2.5 mm bend radius ($r_b$), at 1550 nm (dB/turn) | 0.32 | 0.045 | 0.005 | 0.96 |
| macro bend induced loss when bend around 5 mm bend radius ($r_b$), at 1550 nm (dB/turn | 0.0753 | 0.0110 | 0.0013 | 0.2169 |

TABLE 2

| Parameter | Ex. 6 | Ex. 7 | Ex. 8 | Ex. 9 | Ex. 10 |
|---|---|---|---|---|---|
| Core delta (%) | 0.33 | 0.33 | 0.33 | 0.34 | 0.34 |
| Core dopant | GeO2 | GeO2 | GeO2 | GeO2 | GeO2 |
| Core alpha | 20 | 20 | 20 | 20 | 20 |
| Core radius (microns) | 4.5 | 4.5 | 4.5 | 4.3 | 4.3 |
| Trench start ($r_2$, microns) | 8.2 | 8.2 | 8.2 | 13 | 13 |
| Trench delta (%) | −0.4 | −0.4 | −0.4 | −0.4 | −0.4 |
| Trench dopant | F | F | F | F | F |
| Trench end ($r_3$, microns) | 16.2 | 18.2 | 20.2 | 17 | 19 |
| Trench volume, (% · microns$^2$) | −78.1 | −105.6 | −136.3 | −48.0 | −76.8 |
| Mechanical layer start (microns) | 60.0 | 60.0 | 60.0 | 60.0 | 60.0 |
| Mechanical layer end (microns) | 62.5 | 62.5 | 62.5 | 62.5 | 62.5 |
| Mechanical layer dopant | TiO2 | TiO2 | TiO2 | TiO2 | TiO2 |
| Mechanical layer dopant (wt. %) | 10 | 10 | 10 | 10 | 10 |
| Outer radius (micron) | 62.5 | 62.5 | 62.5 | 62.5 | 62.5 |
| Theoretical Cutoff wavelength (nm) | 1217 | 1217 | 1217 | 1234 | 1234 |
| MFD at 1310 nm (microns) | 9.0 | 9.0 | 9.0 | 9.0 | 9.0 |
| Effective area at 1310 nm (microns$^2$) | 65.5 | 65.5 | 65.5 | 64.2 | 64.2 |
| Dispersion at 1310 nm (ps/(nm · km) | 2.2 | 2.2 | 2.2 | −0.2 | −0.2 |
| Dispersion slope at 1310 nm (ps/(nm$^2$ · km) | 0.0921 | 0.0921 | 0.0921 | 0.0867 | 0.0867 |
| MFD at 1550 nm (microns) | 9.9 | 9.9 | 9.9 | 10.3 | 10.3 |
| Effective area at 1550 nm (microns$^2$) | 77.5 | 77.5 | 77.5 | 80.6 | 80.6 |
| Dispersion at 13550 nm (ps/(nm · km) | 20.4 | 20.4 | 20.4 | 16.9 | 16.9 |
| Dispersion slope at 1550 nm (ps/(nm$^2$ · km) | 0.0643 | 0.0644 | 0.0644 | 0.0609 | 0.0610 |
| Cable Cutoff | 1376 | 1453 | 1539 | 1252 | 1333 |
| macro bend induced loss when bend around 2.5 mm bend radius ($r_b$), at 1550 nm (dB/turn) | 0.15 | 0.02 | 0.002 | 1.58 | 0.18 |
| macro bend induced loss when bend around 5 mm bend radius ($r_b$), at 1550 nm (dB/turn | 0.0359 | 0.0047 | 0.0005 | 0.36 | 0.04 |

TABLE 3

| Parameter | Ex. 11 | Ex. 12 | Ex. 13 | Ex. 14 | Ex. 15 |
|---|---|---|---|---|---|
| Core delta (%) | 0.34 | 0.34 | 0.34 | 0.34 | 0.34 |
| Core dopant | GeO2 | GeO2 | GeO2 | GeO2 | GeO2 |
| Core alpha | 20 | 20 | 20 | 20 | 20 |
| Core radius (microns) | 4.3 | 4.3 | 4.3 | 4.4 | 4.4 |
| Trench start ($r_2$, microns) | 13 | 13 | 13 | 9.7 | 9.7 |
| Trench delta (%) | −0.4 | −0.4 | −0.4 | −0.4 | −0.4 |
| Trench dopant | F | F | F | F | F |
| Trench end ($r_3$, microns) | 21 | 23 | 25 | 15.7 | 16.7 |
| Trench volume, (% · microns$^2$) | −108.8 | −144.0 | −182.4 | −61.0 | −73.9 |
| Mechanical layer start ($r_4$, microns) | 60.0 | 60.0 | 60.0 | 60.0 | 60.0 |
| Mechanical layer end ($r_5$, microns) | 62.5 | 62.5 | 62.5 | 62.5 | 62.5 |
| Mechanical layer dopant | TiO2 | TiO2 | TiO2 | TiO2 | TiO2 |
| Mechanical layer dopant (wt. %) | 10 | 10 | 10 | 10 | 10 |
| Outer radius (micron) | 62.5 | 62.5 | 62.5 | 62.5 | 62.5 |
| Theoretical Cutoff wavelength (nm) | 1234 | 1234 | 1234 | 1235 | 1235 |
| MFD at 1310 nm (microns) | 9.0 | 9.0 | 9.0 | 9.0 | 9.0 |
| Effective area at 1310 nm (microns$^2$) | 64.2 | 64.2 | 64.2 | 64.7 | 64.7 |
| Dispersion at 1310 nm (ps/(nm · km) | −0.2 | −0.2 | −0.2 | 1.0 | 1.0 |
| Dispersion slope at 1310 nm (ps/(nm$^2$ · km) | 0.0867 | 0.0867 | 0.0867 | 0.0902 | 0.0902 |
| MFD at 1550 nm (microns) | 10.3 | 10.3 | 10.3 | 10.1 | 10.1 |
| Effective area at 1550 nm (microns$^2$) | 80.6 | 80.6 | 80.6 | 78.7 | 78.7 |
| Dispersion at 1350 nm (ps/(nm · km) | 16.9 | 16.9 | 16.9 | 18.9 | 18.9 |
| Dispersion slope at 1550 nm (ps/(nm$^2$ · km) | 0.0610 | 0.0610 | 0.0610 | 0.0639 | 0.0639 |
| Cable Cutoff | 1423 | 1521 | 1629 | 1318 | 1354 |
| macro bend induced loss when bend around 2.5 mm bend radius ($r_b$), at 1550 nm (dB/turn) | 0.02 | 0.001 | 0.0001 | 0.51 | 0.19 |
| macro bend induced loss when bend around 5 mm bend radius ($r_b$), at 1550 nm (dB/turn) | 0.004 | 0.0003 | 0.00002 | 0.11 | 0.0437 |

TABLE 4

| Parameter | Ex. 16 | Ex. 17 | Ex. 18 |
|---|---|---|---|
| Core delta (%) | 0.34 | 0.34 | 0.34 |
| Core dopant | GeO2 | GeO2 | GeO2 |
| Core alpha | 20 | 20 | 20 |
| Core radius (microns) | 4.4 | 4.4 | 4.4 |
| Trench start (microns) | 9.7 | 9.7 | 9.7 |
| Trench delta (%) | −0.4 | −0.4 | −0.4 |

TABLE 4-continued

| Parameter | Ex. 16 | Ex. 17 | Ex. 18 |
|---|---|---|---|
| Trench dopant | F | F | F |
| Trench end (microns) | 17.7 | 19.7 | 21.7 |
| Trench volume, (% · microns$^2$) | −87.7 | −117.6 | −150.7 |
| Mechanical layer start (microns) | 60.0 | 60.0 | 60.0 |
| Mechanical layer end (microns) | 62.5 | 62.5 | 62.5 |
| Mechanical layer dopant | TiO2 | TiO2 | TiO2 |
| Mechanical layer dopant (wt. %) | 10 | 10 | 10 |
| Outer radius (micron) | 62.5 | 62.5 | 62.5 |
| Theoretical Cutoff wavelength (nm) | 1235 | 1235 | 1235 |
| MFD at 1310 nm (microns) | 9.0 | 9.0 | 9.0 |
| Effective area at 1310 nm (microns$^2$) | 64.7 | 64.7 | 64.7 |
| Dispersion at 1310 nm (ps/(nm · km) | 1.0 | 1.0 | 1.0 |
| Dispersion slope at 1310 nm (ps/(nm$^2$ · km) | 0.0902 | 0.0902 | 0.0902 |
| MFD at 1550 nm (microns) | 10.1 | 10.1 | 10.1 |
| Effective area at 1550 nm (microns$^2$) | 78.7 | 78.7 | 78.7 |
| Dispersion at 1350 nm (ps/(nm · km) | 18.9 | 18.9 | 18.9 |
| Dispersion slope at 1550 nm (ps/(nm$^2$ · km) | 0.0639 | 0.0639 | 0.0639 |
| Cable Cutoff | 1393 | 1476 | 1569 |
| macro bend induced loss when bend around 2.5 mm bend radius ($r_b$), at 1550 nm (dB/turn) | 0.07 | 0.007 | 0.0006 |
| macro bend induced loss when bend around 5 mm bend radius ($r_b$), at 1550 nm (dB/turn) | 0.02 | 0.002 | 0.0001 |

TABLE 5

| Parameter | Ex. 19 | Ex. 20 | Ex. 22 |
|---|---|---|---|
| Core delta (%) | 0.34 | 0.34 | 0.31 |
| Core dopant | GeO2 | GeO2 | GeO2 |
| Core alpha | 20 | 20 | 20 |
| Core radius ($r_1$, microns) | 4.4 | 4.4 | 4.7 |
| Trench start ($r_2$, microns) | 9.7 | 9.7 | 7.23 |
| Trench delta (%) | −0.4 | −0.4 | −0.4 |
| Trench dopant | F | F | F |
| Trench end ($r_3$, microns) | 17.7 | 19.7 | 15.23 |
| Trench volume, (% · microns$^2$) | −87.7 | −117.6 | −71.9 |
| Mechanical layer start ($r_4$, microns) | 20.0 | 22.7 | 18.0 |
| Mechanical layer end ($r_5$, microns) | 22.5 | 26 | 20 |
| Mechanical layer dopant | TiO2 | TiO2 | TiO2 |
| Mechanical layer dopant (wt. %) | 10 | 10 | 10 |
| Outer radius (micron) | 22.5 | 26.5 | 20.5 |
| Theoretical Cutoff wavelength (nm) | 1235 | 1235 | 1199 |
| MFD at 1310 nm (microns) | 9.0 | 9.0 | 9.1 |
| Effective area at 1310 nm (microns$^2$) | 64.7 | 64.7 | 67.8 |
| Dispersion at 1310 nm (ps/(nm · km) | 1.0 | 1.0 | 3.5 |
| Dispersion slope at 1310 nm (ps/(nm$^2$ · km) | 0.0902 | 0.0902 | 0.0927 |
| MFD at 1550 nm (microns) | 10.1 | 10.1 | 9.8 |
| Effective area at 1550 nm (microns$^2$) | 78.7 | 78.7 | 78.0 |
| Dispersion at 1350 nm (ps/(nm · km) | 18.9 | 18.9 | 21.7 |
| Dispersion slope at 1550 nm (ps/(nm$^2$ · km) | 0.0639 | 0.0639 | 0.0637 |
| Cable Cutoff | 1393 | 1476 | 1373 |
| macro bend induced loss when bend around 2.5 mm bend radius ($r_b$), at 1550 nm (dB/turn) | 0.07 | 0.007 | 0.32 |
| macro bend induced loss when bend around 5 mm bend radius ($r_b$), at 1550 nm (dB/turn) | 0.02 | 0.002 | 0.0753 |

According to the exemplary embodiments of Tables 1A-5, the optical fiber has a mode field diameter at 1550 nm (MFD$_{1550}$) of 8.3 microns≤MFD$_{1550}$≤10.5 microns (e.g., 8.5 microns≤MFD$_{1550}$≤10.5 microns), a single mode cutoff wavelength <1550 nm when bent 1 turn around a 2.5 mm radius mandrel, an effective area at 1550 nm of at least 65 micron$^2$ and less than 85 micron$^2$, and a bending loss at 1550 nm as determined by the mandrel wrap test using a mandrel comprising a radius of 2.5 mm-of ≤1.0 dB/turn.

Figure 4:
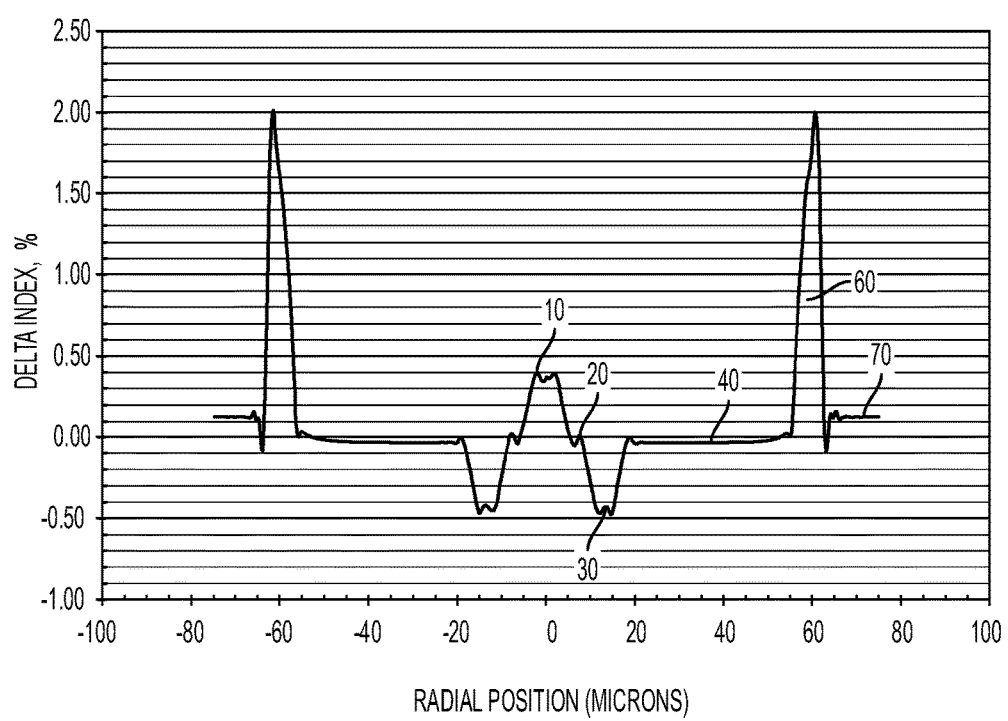
FIG. 4 illustrates refractive index profile of another optical waveguide fiber disclosed herein.

The optical fiber has FIG. 4 shows a measured refractive index profile of the manufactured optical fiber 100 according to one embodiment. In the profile of the exemplary embodiment shown in FIG. 4, the core region 10 which comprises Δ$_1$ is surrounded by depressed cladding inner cladding region 30 comprising Δ$_2$. Inner cladding region 20 is situated between the core region 10 and is surrounded by the trench cladding region 30 comprising Δ$_3$. The outer cladding region 40 surrounds the trench region 30. The absolute difference between Δ$_4$ and Δ$_3$ is about 0.4%, and Δ$_5$ is about 2%. In the embodiment illustrated in FIG. 5, the first cladding region (2) is substantially undoped silica and the second cladding region (3) is silica doped with chlorine. The optical fiber disclosed in Table 2 has cladding (60) that has an outer diameter of about 125 micron.

The manufactured fiber 100 that has the refractive index profile of FIG. 4 had a MFD of 8.8 microns and 9.7 microns at 1310 and 1550 nm, respectively, a 1409 mm 22 m cutoff, attenuation of 0.2 dB/km at 1550 nm, and ultra-low bend loss (measured at 1490 nm) on small diameter mandrels (4 mm, 5 mm, or 6 mm diameter [2 mm, 2.5 mm, or 3 mm radii]) as shown in Table 6, below. Table 6 indicates that when the optical fiber 100 is bent by about a quarter turn (see, for example, FIG. 1) to a bend radius $r_b$=2 mm, the bend loss (measured for example at a t 1490 nm wavelength) will be less than 0.02 dB. More specifically, when the optical fiber 100 is bent by about a quarter turn to a bend radius $r_b$=2 mm, the bend loss is expected to be 0.01 dB or less.

TABLE 6

| # of wraps | Total loss, dB | 2 mm Radius Rod, Loss in dB Per wrap_ |
|---|---|---|
| 0.5 | 0.02 | 0.04 |
| 1 | 0.16 | 0.16 |
| 2 | 0.46 | 0.23 |
| 3 | 1.02 | 0.34 |
| 5 | 2.65 | 0.53 |
| 10 | 5.8 | 0.58 |

| # of wraps | | 2.5 mm Radius Rod, Loss Per wrap_ |
|---|---|---|
| 0.5 | | 0.13 | 0.26 |
| 1 | | 0.24 | 0.24 |
| 2 | | 0.43 | 0.22 |
| 3 | | 0.62 | 0.21 |
| 5 | | 1.15 | 0.23 |
| 10 | | 2.2 | 0.22 |

| # of wraps | | 3 mm Radius Rod, Loss Per wrap_ |
|---|---|---|
| 0.5 | | 0.02 | 0.04 |
| 1 | | 0.14 | 0.14 |
| 2 | | 0.15 | 0.08 |
| 3 | | 0.26 | 0.09 |
| 5 | | 0.4 | 0.08 |
| 10 | | 0.8 | 0.08 |

The optical fibers (100) disclosed herein may be surrounded by the protective coating 70 that surrounds the second outer cladding layer 60, The protective coating may comprise a primary coating P contacting and surrounding the outer cladding region 60, the primary coating P having a Young's modulus of less than 1.0 MPa, preferably less than 0.9 MPa, and in some embodiments not more than 0.8 MPa, and in some embodiments not more than 0.5 MPa, and in some embodiments not more than 0.3 MPa, for example 0.1 to 1 MPa, and in some embodiments 0.1 to 0.5 MPa. The protective coating 70 further comprises a secondary coating S contacting and surrounding the primary coating P, the secondary coating S having a Young's modulus of greater than 1200 MPa, and in some embodiments greater than 1400 MPa, for example at least 1500 MPa, or at least 1600 MPa, at least 1800 MPa, or 1400 MPa to 2500 MPa or 1500 MPa to 2500 MPa. The lower modulus of the primary coating (e.g. <0.5 MPa supports good microbend performance, and higher modulus secondary coating (e.g., >1500 MPa) supports improve puncture resistance of the secondary coating, even when its thickness is reduced. According to some embodiments the outer diameter of the secondary coating S is not greater than 250 microns, for example not greater than 242 microns (e.g., ≤225 microns, ≤10 microns, or ≤00 microns), for example 175-242 microns, or 175 to 225 microns, or 180 to 200 microns. The above fiber designs enable good micro and macro bending performance even with coating diameters of less than 225 microns, which enables smaller diameter, lower cost, higher fiber density cables with excellent optical performance.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
    a core region comprising an outer radius $r_1$ and $3.0 \leq r_1 \leq 7.0$ microns and a relative refractive index $\Delta_{1max}$ and $0.32\% \leq \Delta_{1max} \leq 0.5\%$;
    a depressed index cladding region surrounding said core region, said depressed index cladding region comprising an outer radius $r_3$ and a relative refractive index $\Delta_3$ less than $-0.2\%$, and a trench volume $V_3$ such that $45\%$ $\Delta$-micron$^2 \leq |V_3| \leq 200\%$ $\Delta$-micron$^2$;
    a first outer cladding region surrounding said depressed index cladding region, said outer cladding region comprising a relative refractive index $\Delta_4$ and an outer radius $r_4$; and
    a second outer cladding layer a relative refractive index $\Delta_5$, said second outer cladding region comprising silica based glass doped with 5 to 20 wt % titania and having a thickness $T_M$, such that 3 micron$\leq T_M \leq 30$ microns, the second outer layer having an outer radius $r_5$ of not greater than 65 microns;
    wherein said optical fiber has a mode field diameter at 1550 nm (MFD$_{1550}$) is 8.3 microns$\leq$MFD$_{1550}\leq$10.5 microns, a fiber cutoff wavelength <1550 nm when bent 1 turn around a 2.5 mm radius mandrel, an effective area at 1550 nm of at least 65 micron$^2$ and less than 85 micron$^2$, and a bending loss at 1550 nm as determined by the mandrel wrap test using a mandrel comprising a radius of 2.5 mm-of $\leq 1.0$ dB/turn.

2. The optical fiber of claim 1, wherein said fiber exhibits bending loss at 1550 nm as determined by the mandrel wrap test using a mandrel comprising a radius of 2.5 mm-of $\leq 0.55$ dB/turn.

3. The optical fiber of claim 1, wherein said fiber exhibits bending loss at 1550 nm as determined by the mandrel wrap test using a mandrel comprising a radius of 2.5 mm-of $\leq 0.1$ dB/turn.

4. The optical fiber of claim 1, wherein said fiber exhibits bending loss at 1550 nm as determined by the mandrel wrap test using a mandrel comprising a radius of 2.5 mm of $\leq 0.01$ dB/turn.

5. The optical fiber of claim 1, wherein the outer radius $r_1$ of the core region is $3.0 \leq r_1 \leq 6$, and $70\%$ $\Delta$-micron$^2 \leq |V_3| \leq 150\%$ $\Delta$-micron$^2$.

6. The optical fiber of claim 1, wherein $80\%$ $\Delta$-micron$^2 \leq |V_3| \leq 200\%$ $\Delta$-micron$^2$.

7. The optical fiber of claim 1, wherein $100\%$ $\Delta$-micron$^2 \leq |V_3| \leq 150\%$ $\Delta$-micron$^2$.

8. The optical fiber of claim 1, wherein 10 microns$\leq r_5 \leq 63$ microns.

9. The optical fiber of claim 1, wherein 10 microns$\leq r_5 \leq 50$ microns.

10. The optical fiber of claim 1, wherein 30 microns$\leq r_5 \leq 62.5$ microns.

11. The optical fiber of claim 1, wherein the optical fiber has a 22 m cable cutoff wavelength less than 1550 nm.

12. The optical fiber of claim 1, wherein said a second outer cladding layer comprises 5 to 15 wt % Mania, and 5 micron$\leq T_M \leq 15$ microns.

13. The optical fiber of claim 1, wherein said mode field diameter at 1550 nm (MFD$_{1550}$) is 9 microns$\leq$MFD$_{1550}\leq$10 microns.

14. The optical fiber of claim 1, wherein the depressed index cladding region $\Delta_3$ of $-0.2\% \leq \Delta_3 \leq -0.7\%$.

15. The optical fiber of claim 1, wherein the depressed index cladding region $\Delta_3$ of $-0.3\% \leq \Delta_3 \leq -0.5\%$.

16. The optical fiber of claim 1, wherein the core region comprises $\alpha$, and $10 \leq \alpha \leq 100$.

17. The optical fiber of claim 1, wherein the central core region of said fiber exhibits an alpha $1 \leq \alpha \leq 10$.

18. The fiber of claim 1, wherein the optical fiber exhibits:
    MFD at 1550 nm>9 microns;
    cable cutoff wavelength greater than 1260 nm and less than <1540 nm;
    bend loss at 2.5 mm radius mandrel≤1 dB/turn;
    bend loss at 5 mm radius mandrel<0.5 dB/turn
    wherein the bend loss is macrobend loss and is measured at 1550 nm wavelength.

19. The fiber of claim 18, wherein the optical fiber exhibits macrobend loss bend loss at radius mandrel f not greater than ≤0.55 dB/turn.

20. The fiber of claim 1, wherein the optical fiber exhibits:
    1200 nm<cable cutoff wavelength<1540 nm;
    0.001 dB/turn<macrobend loss at 2.5 mm bend radius<0.55 dB/turn; and 0.001 dB/turn<macrobend loss at 5 mm bend radius<0.5 dB/turn;

wherein the macrobend loss is measured at 1550 nm wavelength.

21. The optical fiber of claim 1, wherein said fiber includes a coating surrounding the second outer cladding layer, said coating comprises: a primary coating P having a Young's modulus 0.1 to 1 MPa; and a secondary coating S having a Young's modulus of 1100 MPa to 2500 MPa, wherein the secondary coating has an outer coating diameter of not greater than 242 microns.

22. The fiber of claim 1, wherein the single mode cutoff wavelength is between 1100 nm and 1450 nm when the fiber bent 1 turn around a 2.5 mm radius mandrel.

23. A micro-optic device comprising:
a. a silicon-photonics chip;
b. an optical fiber having a section bent to a bend radius of ≤5 mm, said fiber being coupled to said silicon-photonics chip; the fiber comprising:
a core region comprising an outer radius $r_1$ in the range from 3.0 to 7.0 microns and a relative refractive index $\Delta_{1max}$ in the range from 0.32% to 0.5%;
a depressed index cladding region surrounding said core region, said depressed index cladding region comprising an outer radius $r_3$ and a relative refractive index $\Delta_3$ less than −0.2%, and a trench volume $V_3$ such that 60% $\Delta$-micron² ≤ |$V_3$| ≤ 200% $\Delta$-micron²;
a first outer cladding region surrounding said depressed index cladding region, said outer cladding region comprising a relative refractive index $\Delta_4$ and an outer radius $r_4$; and
a second outer cladding layer a relative refractive index $\Delta_5$ and an outer radius $r_5$, said second outer cladding region comprising silica based glass doped with 5 to 20 wt % titania and having a thickness $T_{MC}$ such that 3 microns ≤ $T_{MC}$ ≤ 30 microns, the second outer layer having an outer radius of not greater than 65 microns;
wherein said optical fiber has: a mode field diameter at 1550 nm ($MFD_{1550}$) and 8.3 microns ≤ $MFD_{1550}$ ≤ 10.5 microns, a single mode cutoff wavelength <1550 nm when bent 1 turn around a 2.5 mm radius mandrel, an effective area at 1550 nm of at least 65 micron² and less than 85 micron², and a bending loss at 1550 nm as determined by the mandrel wrap test using a mandrel comprising a radius of 2.5 mm-of ≤1.0 dB/turn.

24. The micro-optic device of claim 23 wherein the bending loss at 1550 nm as determined by the mandrel wrap test using a mandrel comprising a radius of 2.5 mm-of ≤0.55 dB/turn.

25. The micro-optic device of claim 23, wherein the optical fiber has a section bent to a bend radius of ≤3 mm.

26. The micro-optic device of claim 23, wherein an optical fiber has a section bent to a bend radius of ≤2.5 mm but not less than 0.5 mm.

27. The micro-optic device of claim 23, wherein the optical fiber has a mode field diameter at 1550 nm ($MFD_{1550}$) is 8.5 microns ≤ $MFD_{1550}$ ≤ 10 microns, and the bending loss at 1550 nm as determined by the mandrel wrap test using a mandrel comprising a radius of 2.5 mm between 0.01 dB/turn and 0.55 dB/turn.

28. The micro-optic device of claim 23, wherein 80% $\Delta$-micron² ≤ |$V_3$| ≤ 200% $\Delta$-micron².

* * * * *

UNITED STATES PATENT AND TRADEMARK OFFICE
CERTIFICATE OF CORRECTION

PATENT NO. : 9,989,699 B2
APPLICATION NO. : 15/790726
DATED : June 5, 2018
INVENTOR(S) : Kevin Wallace Bennett et al.

It is certified that error appears in the above-identified patent and that said Letters Patent is hereby corrected as shown below:

In the Claims

In Column 20, Line 22, Claim 4, delete "2.5 mm of" and insert -- 2.5 mm-of --, therefor.

In Column 20, Line 40, Claim 12, delete "Mania," and insert -- titania, --, therefor.

Signed and Sealed this
Fourth Day of October, 2022

Katherine Kelly Vidal
*Director of the United States Patent and Trademark Office*